United States Patent
Fathony et al.

(10) Patent No.: US 12,536,437 B2
(45) Date of Patent: Jan. 27, 2026

(54) SYSTEMS AND METHODS FOR EXPERT GUIDED SEMI-SUPERVISION WITH CONTRASTIVE LOSS FOR MACHINE LEARNING MODELS

(71) Applicant: Robert Bosch GmbH, Stuttgart (DE)

(72) Inventors: Rizal Zaini Ahmad Fathony, Sumatera Selatan (ID); Filipe J. Cabrita Condessa, Pittsburgh, PA (US); Bijay Kumar Soren, Bangalore-Karnataka (IN); Felix Schorn, Renningen (DE); Florian Lang, Ludwigsburg (DE); Thomas Alber, Filderstadt (DE); Michael Kuka, Waiblingen (DE); Andreas Henke, Diemelstadt (DE)

(73) Assignee: Robert Bosch GmbH (DE)

( * ) Notice: Subject to any disclaimer, the term of this patent is extended or adjusted under 35 U.S.C. 154(b) by 769 days.

(21) Appl. No.: 17/888,849

(22) Filed: Aug. 16, 2022

(65) Prior Publication Data

US 2024/0070449 A1    Feb. 29, 2024

(51) Int. Cl.
*G06N 3/08* (2023.01)
*G06F 16/22* (2019.01)
(Continued)

(52) U.S. Cl.
CPC ............ *G06N 3/08* (2013.01); *G06F 16/2282* (2019.01); *G06F 16/2365* (2019.01); *G06N 3/084* (2013.01); *G06F 16/23* (2019.01)

(58) Field of Classification Search
CPC ...... G06N 3/08; G06N 3/084; G06F 16/2365; G06F 16/2282; G06K 9/6277
(Continued)

(56) References Cited

U.S. PATENT DOCUMENTS

| 2022/0156591 A1* | 5/2022 | Li | G06N 3/084 |
| 2022/0398449 A1* | 12/2022 | Khanna | G06F 16/2365 |
| 2023/0116417 A1* | 4/2023 | Taccari | G06N 3/084 |
| | | | 706/15 |

OTHER PUBLICATIONS

Chen et al., "A Simple Framework for Contrastive Learning of Visual Representations," Proceedings of the 37th International Conference on Machine Learning, PMLR 119, 2020, 11 pages.
(Continued)

*Primary Examiner* — Shahid A Alam
(74) *Attorney, Agent, or Firm* — Dickinson Wright PLLC

(57) ABSTRACT

A method includes, in response to at least one convergence criterion not being met: receiving a labeled dataset that includes a plurality of labeled samples; receiving an unlabeled dataset that includes a plurality of unlabeled samples; identifying a plurality of labeled-unlabeled sample pairs; applying a data augmentation transformation to each labeled sample and each corresponding unlabeled sample; computing, for each least one labeled-unlabeled sample pair, latent representation spaces using the machine learning model; generating, using the machine learning model, a label prediction for each unlabeled sample for each labeled-unlabeled sample pair; computing a loss function for each labeled-unlabeled sample pair of the plurality of labeled-unlabeled sample pairs based on respective latency representation spaces and respective label predictions; applying an optimization function to each respective loss function; and updating a weight value for each labeled-unlabeled sample pair of the plurality of labeled-unlabeled sample pairs responsive to applying the optimization function.

18 Claims, 10 Drawing Sheets

(51) Int. Cl.
  *G06F 16/23*     (2019.01)
  *G06N 3/084*     (2023.01)
(58) Field of Classification Search
  USPC .......................................................... 706/25
  See application file for complete search history.

(56) References Cited

OTHER PUBLICATIONS

Iscen et al., "Label Propagation for Deep Semi-supervised Learning," Proceedings of the IEEE/CVF Conference on Computer Vision and Pattern Recognition, 2019, 10 pages.
Xiao et al., "Contrastive Semi-Supervised Learning for ASR," arXiv:2103.05149v1, 2021, 5 pages.
Zhu et al., "Learning from Labeled and Unlabeled Data with Label Propagation," Technical Report CMMU-CALD-02-107, Carnegie Mellon University, 2002, 19 pages.

* cited by examiner

SYSTEMS AND METHODS FOR EXPERT GUIDED SEMI-SUPERVISION WITH CONTRASTIVE LOSS FOR MACHINE LEARNING MODELS

TECHNICAL FIELD

The present disclosure relates to computer systems that have capability for artificial intelligence, including neural networks. In embodiments, this disclosure relates to using expert guided, semi-supervised, machine learning using training datasets having label propagation.

BACKGROUND

In development of data for training machine learning models, data collection and labeling is a laborious, costly, and time-consuming venture, which may represent a major bottleneck in most current machine learning pipelines. In many real-world applications, the number of labeled samples is relatively limited, while unlabeled samples are relatively unabundant and, typically, require limited resources to collect. Typically, in order to use such unlabeled samples, labels are applied, using, generally, manual efforts, which tends to drive the increased costs and time consumption of preparing labeled training data.

SUMMARY

An aspect of the disclosed embodiments includes a method for semi-supervised training of a machine learning model. The method includes, in response to at least one convergence criterion not being met: receiving a labeled dataset that includes a plurality of labeled samples; receiving an unlabeled dataset that includes a plurality of unlabeled samples; identifying a plurality of labeled-unlabeled sample pairs, each labeled-unlabeled sample pair including a respective labeled sample of the labeled samples and a corresponding unlabeled sample of the plurality of unlabeled samples; applying a data augmentation transformation to each labeled sample and each corresponding unlabeled sample for each labeled-unlabeled sample pair of the plurality of labeled-unlabeled sample pairs; computing, for each least one labeled-unlabeled sample pair, latent representation spaces using the machine learning model; generating, using the machine learning model, a label prediction for each unlabeled sample for each labeled-unlabeled sample pair; computing a loss function for each labeled-unlabeled sample pair of the plurality of labeled-unlabeled sample pairs based on respective latency representation spaces and respective label predictions; applying an optimization function to each respective loss function; and updating a weight value for each labeled-unlabeled sample pair of the plurality of labeled-unlabeled sample pairs responsive to applying the optimization function.

Another aspect of the disclosed embodiments includes a system for semi-supervised training of a machine learning model. The system includes a processor and a memory, The memory includes instructions that, when executed by the processor, cause the processor to, in response to at least one convergence criterion not being met: receive a labeled dataset that includes a plurality of labeled samples; receive an unlabeled dataset that includes a plurality of unlabeled samples; identify a plurality of labeled-unlabeled sample pairs, each labeled-unlabeled sample pair including a respective labeled sample of the labeled samples and a corresponding unlabeled sample of the plurality of unlabeled samples; apply a data augmentation transformation to each labeled sample and each corresponding unlabeled sample for each labeled-unlabeled sample pair of the plurality of labeled-unlabeled sample pairs; compute, for each least one labeled-unlabeled sample pair, latent representation spaces using the machine learning model; generate, using the machine learning model, a label prediction for each unlabeled sample for each labeled-unlabeled sample pair; compute a loss function for each labeled-unlabeled sample pair of the plurality of labeled-unlabeled sample pairs based on respective latency representation spaces and respective label predictions; apply an optimization function to each respective loss function; and update a weight value for each labeled-unlabeled sample pair of the plurality of labeled-unlabeled sample pairs responsive to applying the optimization function.

Another aspect of the disclosed embodiments includes an apparatus for semi-supervised training of a machine learning model. The apparatus includes a processor and a memory. The memory includes instructions that, when executed by the processor, cause the processor to, in response to at least one convergence criterion not being met: receive a labeled dataset that includes a plurality of labeled samples; receive an unlabeled dataset that includes a plurality of unlabeled samples; identify a plurality of labeled-unlabeled sample pairs, each labeled-unlabeled sample pair including a respective labeled sample of the labeled samples and a corresponding unlabeled sample of the plurality of unlabeled samples; apply a data augmentation transformation to each labeled sample and each corresponding unlabeled sample for each labeled-unlabeled sample pair of the plurality of labeled-unlabeled sample pairs; compute, for each least one labeled-unlabeled sample pair, latent representation spaces using a feature extractor of the machine learning model; generate, using one or more predictor networks of the machine learning model, a label prediction for each unlabeled sample for each labeled-unlabeled sample pair; compute a loss function for each labeled-unlabeled sample pair of the plurality of labeled-unlabeled sample pairs based on respective latency representation spaces and respective label predictions, the loss function including a combination of a mean squared error of each label prediction and a contrastive loss; apply an optimization function to each respective loss function; and update a weight value for each labeled-unlabeled sample pair of the plurality of labeled-unlabeled sample pairs responsive to applying the optimization function.

DETAILED DESCRIPTION

Figure 1:
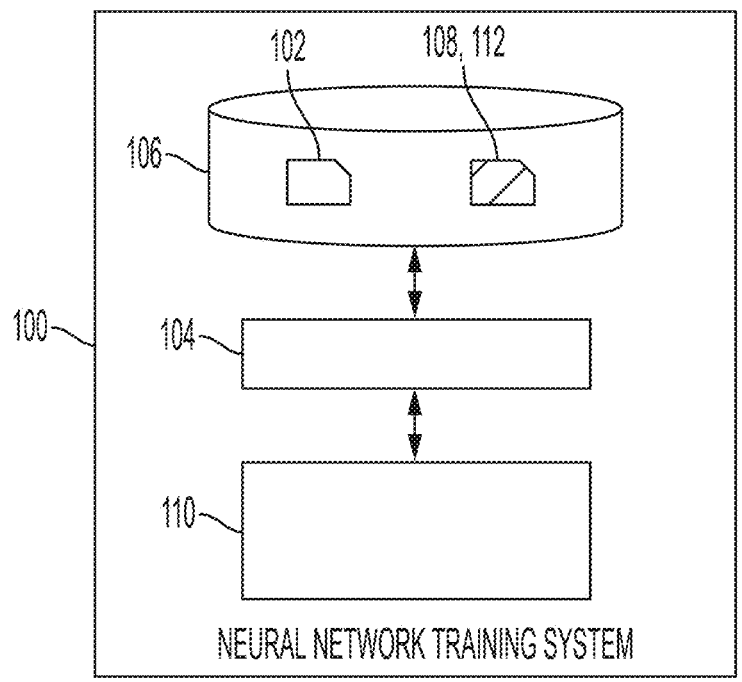
FIG. 1 generally illustrates a system for training a neural network, according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, in development of data for training machine learning models, data collection and labeling is a laborious, costly, and time-consuming venture, which may represent a major bottleneck in most current machine learning pipelines. In many real-world applications, the number of labeled samples is relatively limited, while unlabeled samples are relatively unabundant and, typically, require limited resources to collect. Typically, in order to use such unlabeled samples, labels are applied, using, generally, manual efforts, which tends to drive the increased costs and time consumption of preparing labeled training data.

Typically, systems configured to provide contrastive loss formulation for self-supervised learning do not provide label information is available to the learner. For a given batch (e.g., such as a minibatch of samples having a relatively small number of samples) of samples with a size of n, the contrastive learning approach starts by performing data augmentation on each sample, resulting 2n samples (e.g., n pairs). Such an approach typically creates latent representations of each sample and forces the representation of the paired samples to be similar by employing the contrastive loss, which may be defined as:

$$\ell(i, j) = -\log \frac{\exp(sim(z_i, z_j)/\tau)}{\sum_{k=1}^{2n} \mathbb{1}_{[k \neq i]} \exp(sim(z_i, z_k)/\tau)}$$

$$\mathcal{L} = \frac{1}{2n} \sum_{k=1}^{n} [\ell(2k-1, 2k) + \ell(2k, 2k-1)]$$

where $sim(z_i, z_j)$ is a similarity metric between two latent representations and $\tau$ denotes a temperature parameter. For each sample, a corresponding paired sample is considered as the positive sample, whereas other samples in the batch are the negative samples.

Further, such approaches typically focus on self-supervised learning without using label information or to semi-supervised learning that is limited to classification tasks (e.g., where it may be relatively easy to define positive and negative samples).

Accordingly, systems and methods, such as those described herein, configured to use the unlabeled samples in a semi-supervised learning setting to improve the performance of machine learning algorithms, may be desirable. In some embodiments, the systems and methods described herein may be configured to provide machine learning training datasets using labeled samples, unlabeled samples, expert knowledge provided by practitioners associated with the machine learning algorithm, or a combination thereof. For example, the systems and methods described herein may be configured to, for sound perception evaluation application, receive, at least, some criteria of properties that lead to two different sounds perceived similarly by the human ear (e.g., which may be provided by sound analysis experts).

In some embodiments, the systems and methods described herein may be configured to provide label propagation on continuous labels in a deep semi-supervised learning application. The systems and methods described herein may be configured to inject expert-derived rules into the machine learning pipeline, particularly expert-derived similarity metric(s). The systems and methods described herein may be configured to perform, using the machine learning model, regression tasks where the labels are continuously valued. The systems and methods described herein may be configured to determine a representation space, learned using a deep neural network, that is used as a distance or similarity metric for performing label propagation (e.g., which may be useful for various applications that rely on a capability of a deep neural network to learn representations of complex objects).

In some embodiments, the systems and methods described herein may be configured to receive, as input, a set of labeled training data X consisting of labeled samples $\{(x_1, y_1), (x_2, y_2), \ldots, (x_n, y_n)\}$, where $x_i$ is the i-th sample, $y^i$ is the corresponding label, and n is the number of labeled samples. The systems and methods described herein may be configured to receive, as input, a set of unlabeled data U consisting of unlabeled samples $\{x_{(n+1)}, x_{(n+2)}, \ldots, x_{(\{n+u\})}\}$, where u is the number of unlabeled samples. The systems and methods described herein may be configured to receive, as input, expert domain knowledge in the form of a similarity graph G over both labeled and unlabeled data (e.g., where, if $x_i$ and $x_j$ are connected in the graph, it means that they are similar to each other). The systems and methods described herein may be configured to perform, using the machine learning model, regression tasks, where the label y is continuous-valued, (e.g., $y \in \mathfrak{R}$), which may be in contrast to classification tasks where the label is discrete-valued. It should be understood that, the systems and methods described herein may be configured to perform classification task, in addition to or instead of regression tasks.

In some embodiments, the systems and methods described herein may be configured to use a feature extractor network $f_\theta(x)$ (e.g., parameterized by $\theta$) that maps a sample $x_i$ to a latent representation space $z_i$. The systems and methods described herein may be configured to use a predictor (sub-)network $g_\omega(x)$ (e.g., parameterized by $\omega$) that receives the latent representation $z_i$ and outputs a predicted label $\hat{y}_i$. The systems and methods described herein may be configured to use a k-nearest neighbor (KNN) graph similarity extractor that receives all the latent representation for the labeled and unlabeled data and outputs a similarity graph $G_{knn}$, based on the k nearest neighbors measured on the latent space. The systems and methods described herein may be configured to use a cosine similarity metric to measure the similarity between two latent representations, where each node in $G_{knn}$ incudes k connection to the k most similar samples.

The systems and methods described herein may be configured to use a label propagator that receives a similarity graph consisting of both labeled and unlabeled data. The label propagator may propagate the label from the labeled data to the unlabeled data by iterative propagating known labels to corresponding neighbors in the graph. The systems and methods described herein may be configured to use a loss function $\ell(\hat{y},y)$ that serves as an objective in the training process. The systems and methods described herein may be configured to use the squared error, $\ell(\hat{y},y)=(\hat{y}-y)^2$, as our regression loss function.

In some embodiments, the systems and methods described herein may be configured to provide a fully supervised learning stage that includes, at least, training the machine learning model (e.g., including the feature extractor and predictor networks) using labeled data (e.g., such that the feature extractor is usable for the label propagation) for ten epochs (e.g., or other suitable number of epochs) by minimizing:

$$\min_{\theta,\omega} \sum_{i=1}^n \ell(g_\omega(f_\theta(x_i)), y_i) = \min_{\theta,\omega} \sum_{i=1}^n (g_\omega(f_\theta(x_i)) - y_i)^2$$

In some embodiments, the systems and methods described herein may be configured to provide a semi-supervised learning stage that includes, at least, performing semi-supervised learning using both labeled and unlabeled data by iteratively performing the steps described herein For example, the systems and methods described herein may be configured to use the trained networks of the machine learning model, compute the latent representation spaces $z_i$ for all samples (e.g., both labeled and unlabeled samples). The systems and methods described herein may be configured to use the KNN graph similarity extractor to construct a KNN similarity graph $G_{knn}$, using the computed latent representation. The systems and methods described herein may be configured to augment the KNN similarity graph $G_{knn}$ with the expert-derived similarity graph G. The systems and methods described herein may be configured to output the combined similarity graph $G_{comb}$ (e.g., where two nodes in $G_{comb}$ are connected if the two nodes are connected in at least one of the $G_{knn}$ and G graph). The systems and methods described herein may be configured to propagate the label using the label propagator by receiving $G_{comb}$ as the input. The systems and methods described herein may be configured to output, using the label propagator, a propagated label $\tilde{y}$ for each unlabeled sample with a confidence level a that measures a confidence of the propagator with the propagated label. The systems and methods described herein may be configured to train the feature extractor and predictor networks using both labeled data and unlabeled data with the propagated label for one epoch by optimizing:

$$\min_{\theta,\omega} \sum_{i=1}^n (g_\omega(f_\theta(x_i)) - y_i)^2 + \sum_{i=n+1}^{n+u} \alpha_i(g_\omega(f_\theta(x_i)) - \tilde{y}_i)^2.$$

The systems and methods described herein may be configured to determine a summation over the squared error for the labeled samples and a summation of the weighted squared error on the unlabeled samples with the propagated labels. The systems and methods described herein may be configured to check for convergence criteria, where if the convergence criteria is met, the systems and methods described herein may be configured to stop the training (e.g., otherwise return to the beginning of the semi-supervised learning).

In some embodiments, the systems and methods described herein may be configured to provide label propagation, as described. The systems and methods described herein may be configured to receive, as input, labeled samples $\{(x_1,y_1), (x_2,y_2), \ldots, (x_n,y_2)\}$, unlabeled samples $\{x_{(n+1)}, x_{(n+2)}, \ldots, x_{(\{n+u\})}\}$, a similarity graph $G_{comb}$, and/or a confident discount $\eta$.

In some embodiments, the systems and methods described herein may be configured to generate a weighted graph $G_{weighted}$ from $G_{comb}$, where the weight of an edge is the cosine similarity of the latent representation of its connected nodes. The systems and methods described herein may be configured to prepare the propagated label variable $\tilde{y}_i, \forall i \in [1,n+u]$ and confidence variable $\alpha_i, \forall i \in [1,n+u]$. The systems and methods described herein may be configured to set $\tilde{y}_i=y_i$ and $\alpha_i=1$ for the labeled samples.

The systems and methods described herein may be configured to set $\tilde{y}_i$=Null and $\alpha_i$=Null for unlabeled samples. The systems and methods described herein may be configured to, until the convergence condition is met, repeat: performing one step propagation (e.g., which may include, for each sample (each node in the graph): normalizing the weights of its non-null neighbors, computing the new propagated samples as the weighted average over the label of its non-null neighbors; and/or computing the new confidence for the propagated label as the average of the confidence of its non-null neighbors multiplied by the confident discount); and clamping the labeled data (e.g., for each labeled sample, set $\tilde{y}_i=y_i$ and $\alpha_i=1$. In some embodiments, the systems and methods described herein may be configured to return propagated labels $\tilde{y}$ and a corresponding confidence $\alpha$ for each unlabeled sample.

In some embodiments, the systems and methods described herein may be configured to provide semi-supervised learning for regression tasks. The systems and methods described herein may be configured to provide semi-supervised learning for regression tasks where the labels are continuously valued. The systems and methods described herein may be configured to inject expert-derived rules into a contrastive loss formulation in the form of a similarity graph. The systems and methods described herein may be configured to provide semi-supervised learning using both labeled and unlabeled data.

The systems and methods described herein may be configured to a training procedure performed in a minibatch training setting. The systems and methods described herein may be configured to, using available data, draws m samples of labeled data from X samples. The systems and methods described herein may be configured to, for each labeled data x, select an unlabeled sample $\bar{x}$ from U that is connected to x in the similarity graph G (e.g., which indicates that $\bar{x}$ is undistingushably similar to x). The systems and methods described herein may be configured to, in response to x having more than one unlabeled neighbors, randomly selected a neighbor. The systems and methods described herein may be configured to, in response to x not have a corresponding unlabeled neighbors, assign $\bar{x}=x$. The systems and methods described herein may be configured to apply a data augmentation transformation to both x and $\bar{x}$. The systems and methods described herein may be configured to, for each batch, draw m pairs of labeled-unlabeled samples (e.g., 2m samples in total). The systems and methods described herein may be configured to provide information indicating non-pair samples in the batch that are connected in the similarity graph G.

Figure 3A:
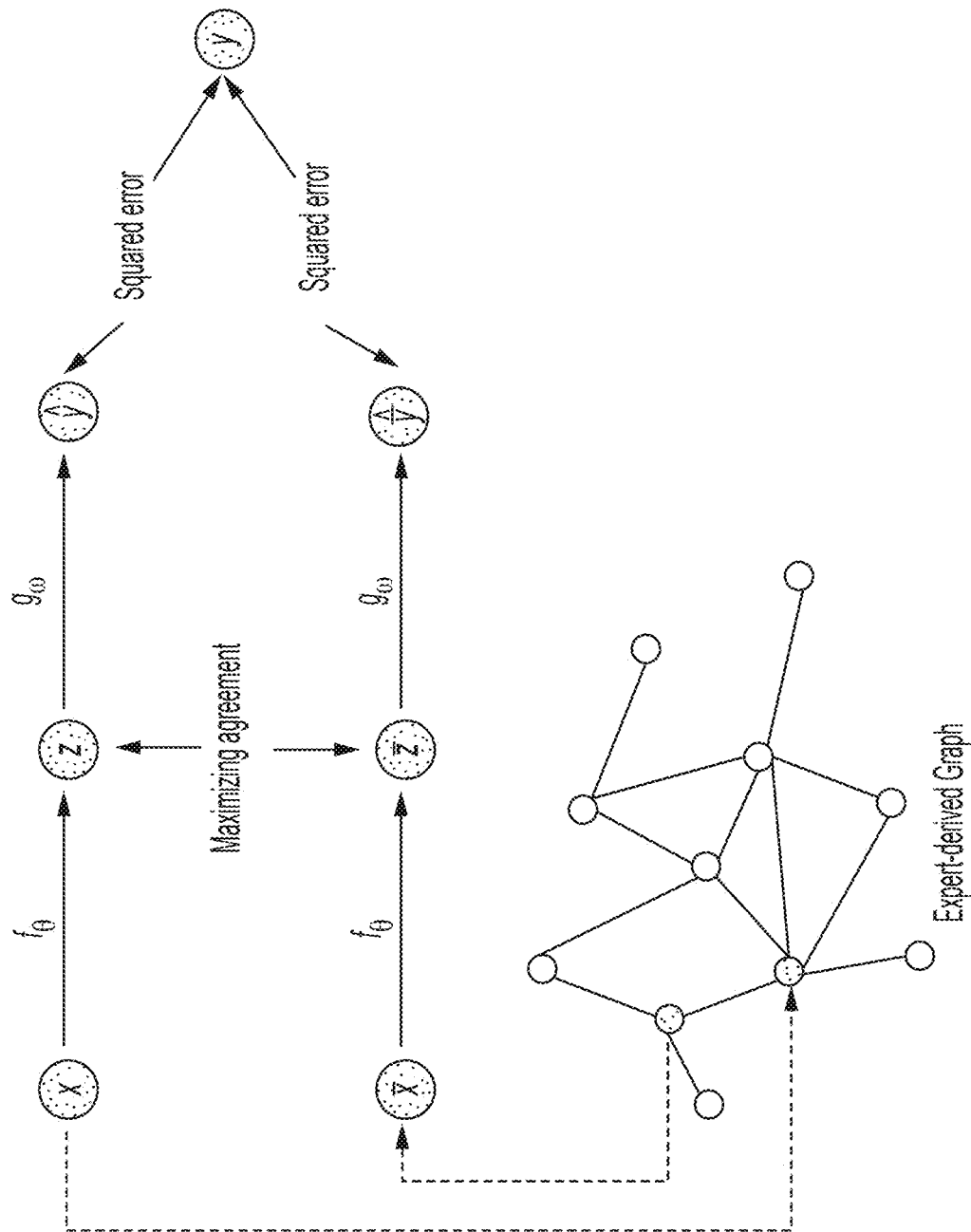
FIGS. 3A and 3B generally illustrate machine learning training pipelines, according to the principles of the present disclosure.
Figure 3B:
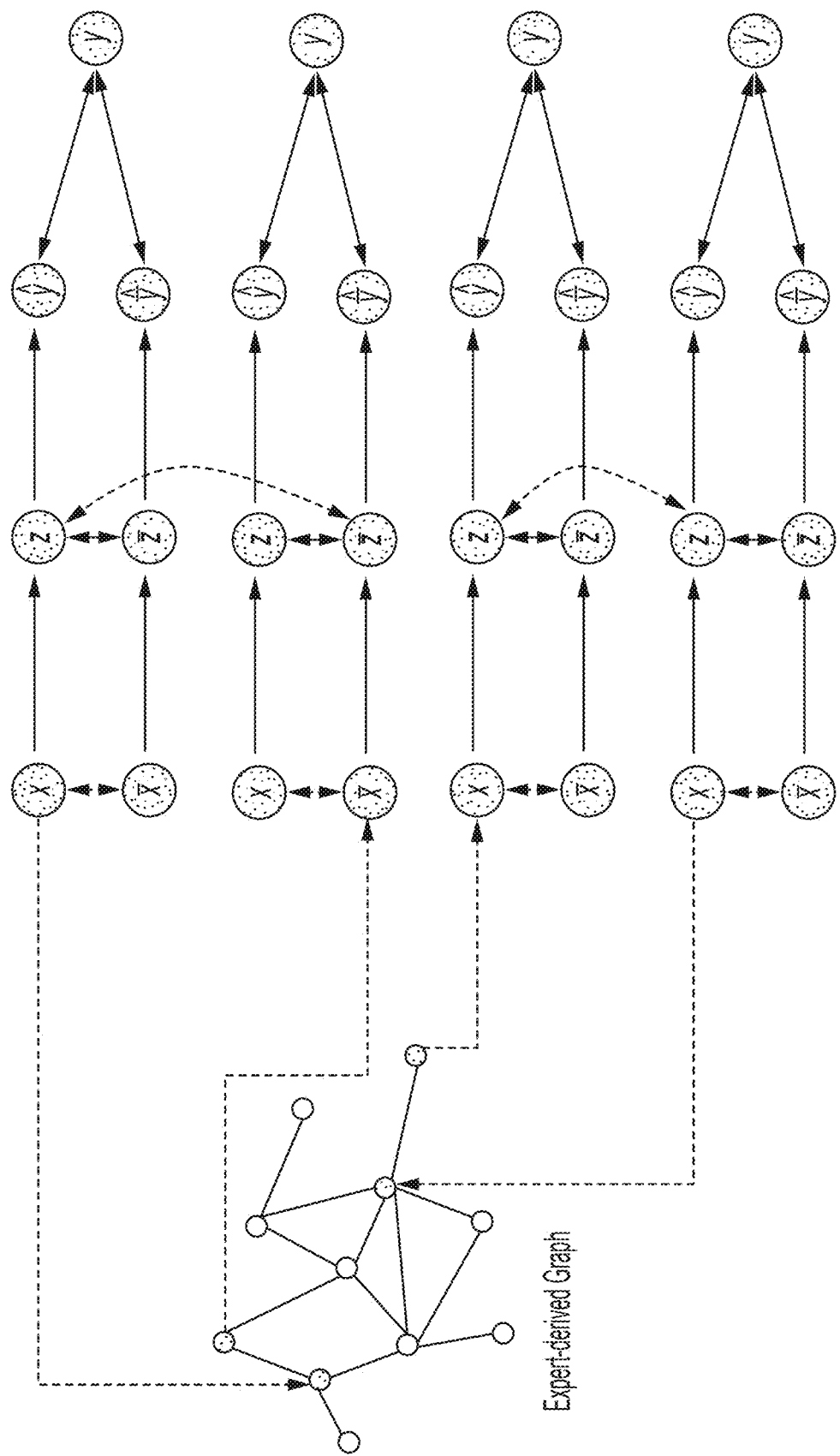

In some embodiments, as is generally illustrated in FIGS. 3A and 3B, the systems and methods described herein may be configured to provide a neural network architecture that includes a feature extractor network $f_\theta(x)$ that maps a sample $x_i$ to a latent representation space $z_i$ and a predictor (sub-) network $g_\omega(x)$ that receives the latent representation $z_i$ and output a predicted label $\hat{y}_i$. The feature extractor network may be parameterized by $\theta$ and the predictor network may be parameterized by $\omega$.

In some embodiments, the systems and methods described herein may be configured to use a loss function $\ell(\hat{y},y)$ that serves as an objective in the training process. The loss function may include a combination a mean squared error (MSE) of the label prediction and a contrastive loss that encourages the latent representation of similar samples (e.g., either labeled or unlabeled samples) to be similar. The loss may be defined as:

$$z_i = f_\theta(x_i)$$

$$\ell(i, j) = -\log \frac{\exp(sim(z_i, z_j)/\tau) + \sum_{k=1}^{2n} \mathbb{1}_{[(i,k) \in E_G]} \exp(sim(z_i, z_k)/\tau)}{\sum_{k=1}^{2n} \mathbb{1}_{[k \neq i \wedge (i,k) \notin E_G]} \exp(sim(z_i, z_k)/\tau)}$$

$$\mathcal{L}_{Contrastive} = \frac{1}{2n} \sum_{k=1}^{n} [\ell(2k-1, 2k) + \ell(2k, 2k-1)]$$

$$\mathcal{L}_{MSE} = \frac{1}{2n} \sum_{k=1}^{n} [(\hat{y}_{2k-1} - y_{2k-1})^2 + (\hat{y}_{2k} - y_{2k-1})^2] =$$

$$1/2n \sum (k=1)^n [(g_\omega(z_(2k-1)) - y_(2k-1))^2 + (g_\omega(z_2k) - y_(2k-1))^2]$$

$$\mathcal{L} = \mathcal{L}_{MSE} + \tau \mathcal{L}_{Contrastive}$$

where $\tau$ is a parameter that adjusts the importance of the contrastive loss relative to the MSE loss, and $E_G$ denotes the edges in the similarity graph G. The expression $\mathbb{1}_{[(i,k) \in E_G]}$ denotes that the i-th and j-th samples are neighbors in G, whereas the expression $\mathbb{1}_{[(i,k) \notin E_G]}$ indicates that they are not neighbors. Note that, for the MSE loss, the systems and methods described herein may be configured to use the label for the labeled sample (e.g., sample with 'odd' indices) as the true label for a corresponding pair (e.g., sample with 'even' indices). For each sample i, the 'positive' samples for the contrastive loss are the corresponding pair and other samples in the batch that are connected to i in the similarity graph G, whereas the 'negative' samples are all other samples in the batch that are not neighbor of i in the graph G.

In some embodiments, the systems and methods described herein may be configured to use an optimization algorithm that optimizes the parameters by reducing and/or minimizing the loss function. For example, the systems and methods described herein may be configured to use an optimizer that optimizes the loss function (e.g. Adam optimizer or other suitable optimizer) in a stochastic gradient descent optimization setting or other suitable setting, scenario, and the like.

In some embodiments, the systems and methods described herein may be configured to, until convergence condition is met: draw labeled-unlabeled pair samples for a minibatch training and/or extract similarity relation information associated with the samples in the similarity graph; compute latent representations z and the predicted rating $\hat{y}$ for each sample using the feature extractor network $f_\theta$ and the predictor network $g_\omega$; compute the loss function $\mathcal{L}$, which may include a combination of the MSE loss and the contrastive loss; back-propagate the loss signal to the parameters the networks, and update a weight based on the gradient using the optimizer.

In some embodiments, the systems and methods described herein may be configured to, in response to at least one convergence criterion not being met, continue a training loop. For example, the systems and methods described herein may be configured to receive a labeled dataset that includes a plurality of labeled samples. The systems and methods described herein may be configured to receive an unlabeled dataset that includes a plurality of unlabeled samples. The systems and methods described herein may be configured to identify a plurality of labeled-unlabeled sample pairs. Each labeled-unlabeled sample pair may include a respective labeled sample of the labeled samples and a corresponding unlabeled sample of the plurality of unlabeled samples. In some embodiments, the systems and methods described herein may be configured to identify the plurality of labeled-unlabeled sample pairs using a similarity graph associated with the labeled dataset and the unlabeled dataset. The systems and methods described herein may be configured to generate the similarity graph based on at least an expert derived similarity graph.

The systems and methods described herein may be configured to apply a data augmentation transformation to each labeled sample and each corresponding unlabeled sample for each labeled-unlabeled sample pair of the plurality of labeled-unlabeled sample pairs. The systems and methods described herein may be configured to compute, for each least one labeled-unlabeled sample pair, latent representation spaces using the machine learning model (e.g., which may be referred to herein as a machine learning algorithm). The machine learning model may include a feature extractor and one or more predictor networks. The systems and methods described herein may be configured to generate, using the machine learning model, a label prediction for each unlabeled sample for each labeled-unlabeled sample pair. The systems and methods described herein may be configured to compute a loss function for each labeled-unlabeled sample pair of the plurality of labeled-unlabeled sample pairs based on respective latency representation spaces and respective label predictions. The loss function may include a combination of a mean squared error of each label prediction and a contrastive loss. The systems and methods described herein may be configured to apply an optimization function to each respective loss function. The optimization function may include a stochastic gradient descent optimization function. The systems and methods described herein may be configured to update a weight value for each labeled-unlabeled sample pair of the plurality of labeled-unlabeled sample pairs responsive to applying the optimization function.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
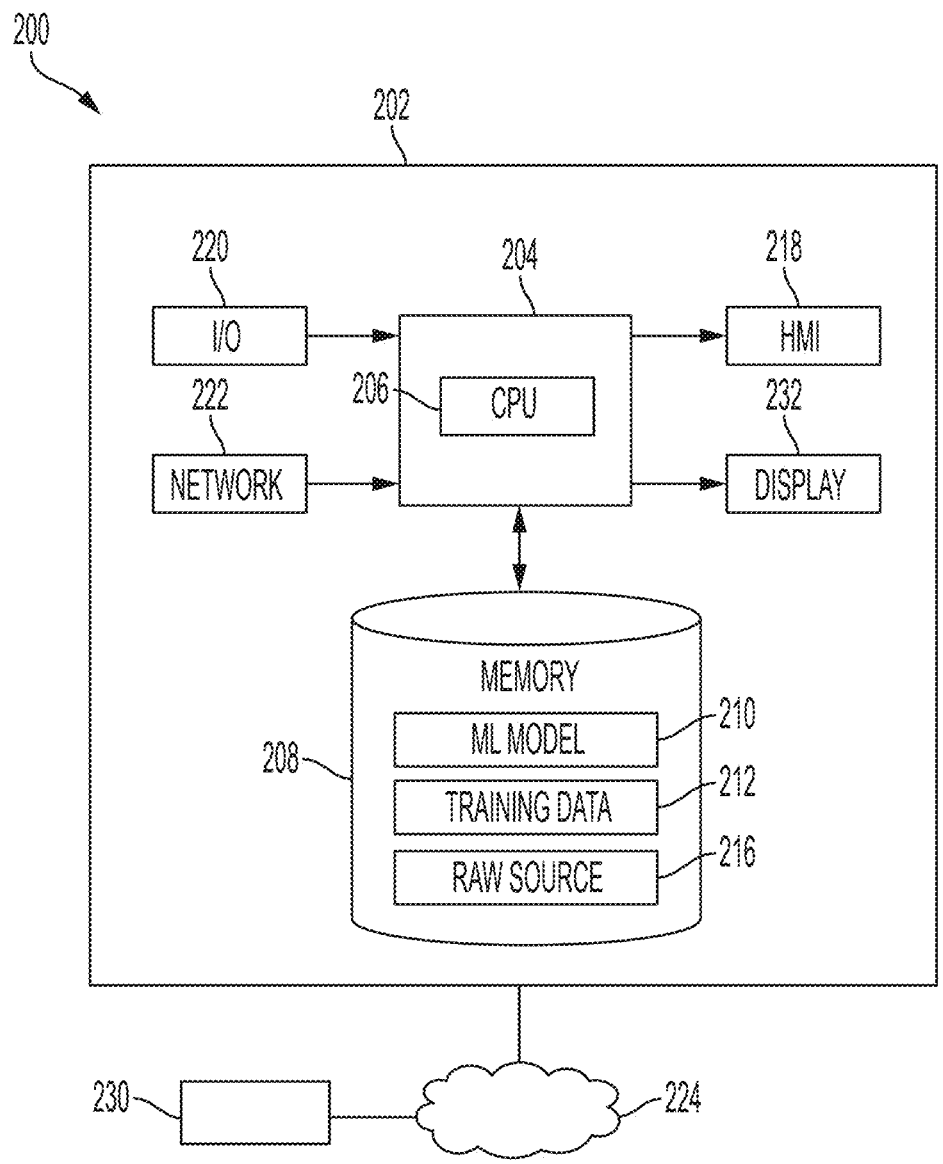
FIG. 2 generally illustrates a computer-implemented method for training and utilizing a neural network, according the principles of the present disclosure.

FIG. 2 depicts a data annotation/augmentation system 200 to implement a system for annotating and/or augment data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, and raw or partially processed sensor data (e.g., radar map of objects). In some embodiments, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., pedestrian). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In the example, the machine-learning algorithm 210 may process raw source data 216 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

In some embodiments, the system 200 may, in response to at least one convergence criterion not being met, continue a training loop. For example, the system 200 may receive a labeled dataset that includes a plurality of labeled samples. The system 200 may receive an unlabeled dataset that includes a plurality of unlabeled samples. The system 200 may identify a plurality of labeled-unlabeled sample pairs. Each labeled-unlabeled sample pair may include a respective labeled sample of the labeled samples and a corresponding unlabeled sample of the plurality of unlabeled samples. The system 200 may identify the plurality of labeled-unlabeled sample pairs using a similarity graph associated with the labeled dataset and the unlabeled dataset. The system 200 may generate the similarity graph based on at least an expert derived similarity graph.

The system 200 may apply a data augmentation transformation to each labeled sample and each corresponding unlabeled sample for each labeled-unlabeled sample pair of the plurality of labeled-unlabeled sample pairs. The system 200 may compute, for each least one labeled-unlabeled sample pair, latent representation spaces using the machine learning algorithm 210. The machine learning algorithm 210 may include a feature extractor and one or more predictor networks, as described herein. The system 200 may generate, using the machine learning algorithm 210, a label prediction for each unlabeled sample for each labeled-unlabeled sample pair. The system 200 may compute a loss function for each labeled-unlabeled sample pair of the plurality of labeled-unlabeled sample pairs based on respective latent representation spaces and respective label predictions. The loss function may include a combination of a mean squared error of each label prediction and a contrastive loss. The system 200 may apply an optimization function to each respective loss function. The optimization function may include a stochastic gradient descent optimization function. The system 200 may update a weight value for each labeled-unlabeled sample pair of the plurality of labeled-unlabeled sample pairs responsive to applying the optimization function.

Figure 4:
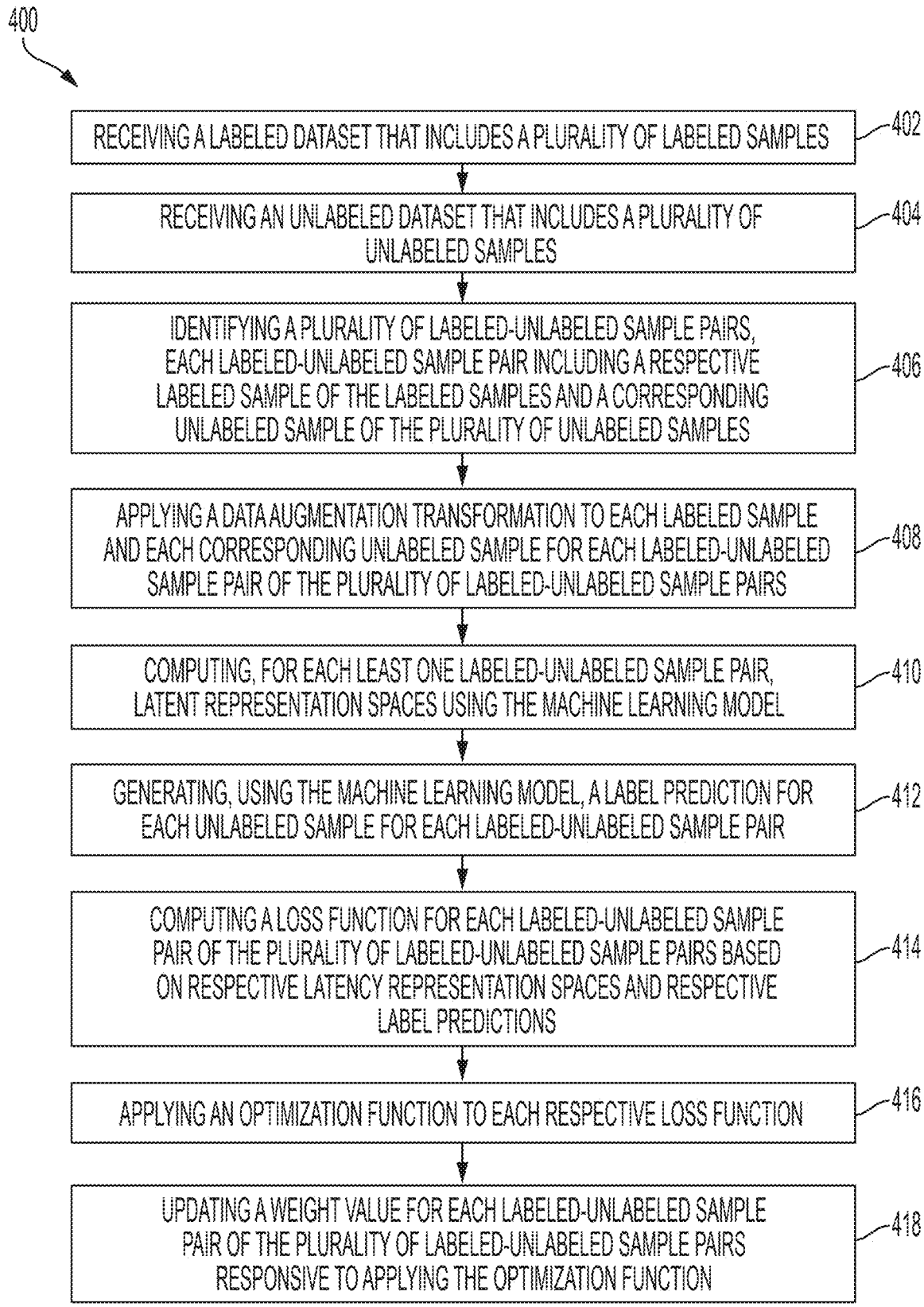
FIG. 4 is a flow diagram generally illustrating a semi-supervised machine learning training method, according to the principles of the present disclosure.

FIG. 4 is a flow diagram generally illustrating a semi-supervised machine learning training method 400 according to the principles of the present disclosure. The method 400 may, in response to at least one convergence criterion not being met, perform steps 402-418. At 402, the method 400 receives a labeled dataset that includes a plurality of labeled samples. For example, the system 20 may receive the labeled dataset that includes the plurality of labeled samples.

At 404, the method 400 receives an unlabeled dataset that includes a plurality of unlabeled samples. For example, the system 200 may receive the unlabeled dataset that includes the plurality of unlabeled samples.

At 406, the method 400 identifies a plurality of labeled-unlabeled sample pairs. Each labeled-unlabeled sample pair may include a respective labeled sample of the labeled samples and a corresponding unlabeled sample of the plurality of unlabeled samples. For example, the system 200 may identified the plurality of labeled-unlabeled sample pairs.

At 408, the method 400 applies a data augmentation transformation to each labeled sample and each corresponding unlabeled sample for each labeled-unlabeled sample pair of the plurality of labeled-unlabeled sample pairs. For example, the system 200 may apply the data augmentation transformation to each labeled sample and each corresponding unlabeled sample for each labeled-unlabeled sample pair of the plurality of labeled-unlabeled sample pairs.

At 410, the method 400 may compute, for each least one labeled-unlabeled sample pair, latent representation spaces using the machine learning model. For example, the system 200 may compute, for each least one labeled-unlabeled sample pair, latent representation spaces using the machine learning algorithm 210.

At 412, the method 400 generates, using the machine learning model, a label prediction for each unlabeled sample for each labeled-unlabeled sample pair. For example, the system 200 may generate, using the machine learning algorithm 210, the label prediction for each unlabeled sample for each labeled-unlabeled sample pair.

At 414, the method 400 computes a loss function for each labeled-unlabeled sample pair of the plurality of labeled-unlabeled sample pairs based on respective latency representation spaces and respective label predictions. For example, the system 200 may compute the loss function for each labeled-unlabeled sample pair of the plurality of labeled-unlabeled sample pairs based on respective latency representation spaces and respective label predictions.

At 416, the method 400 applies an optimization function to each respective loss function. For example, the system 200 may apply the optimization function to each respective loss function.

At 418, the method 400 updates a weight value for each labeled-unlabeled sample pair of the plurality of labeled-unlabeled sample pairs responsive to applying the optimization function. For example, the system 200 may update the weight value for each labeled-unlabeled sample pair of the plurality of labeled-unlabeled sample pairs responsive to applying the optimization function.

Figure 5:
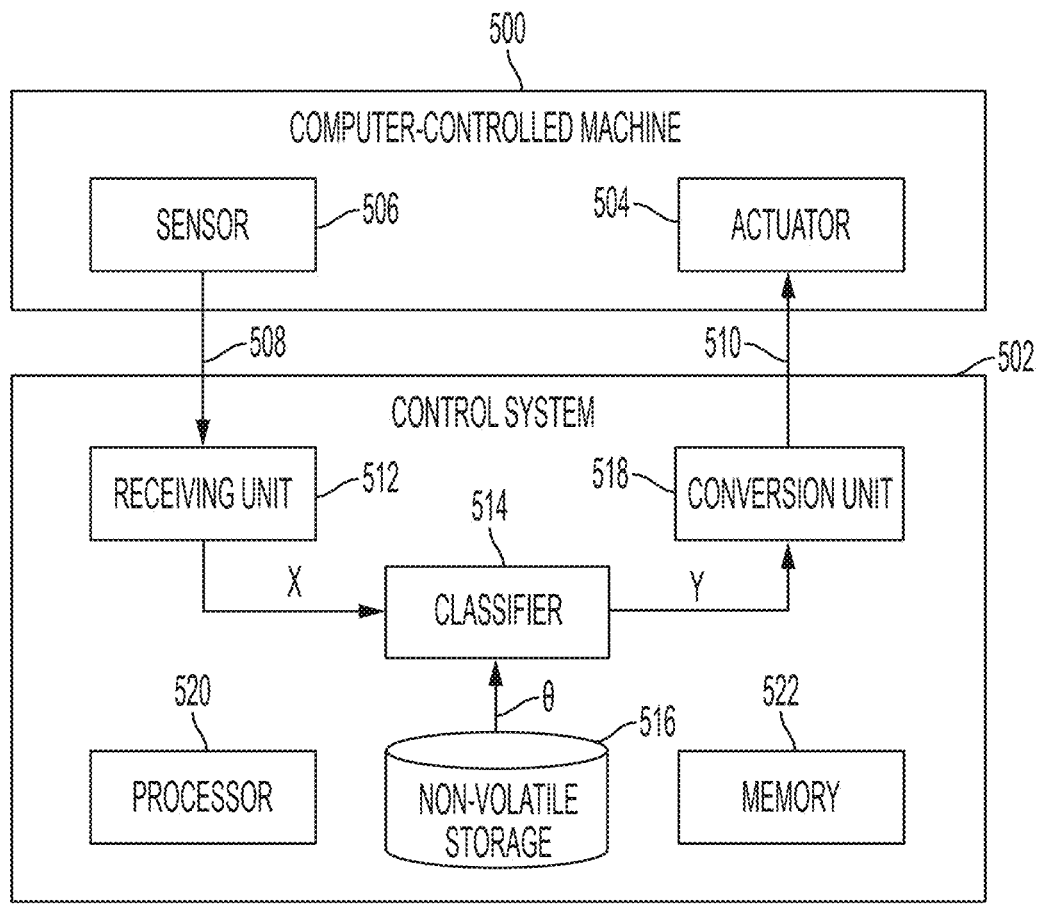
FIG. 5 depicts a schematic diagram of an interaction between a computer-controlled machine and a control system, according to the principles of the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
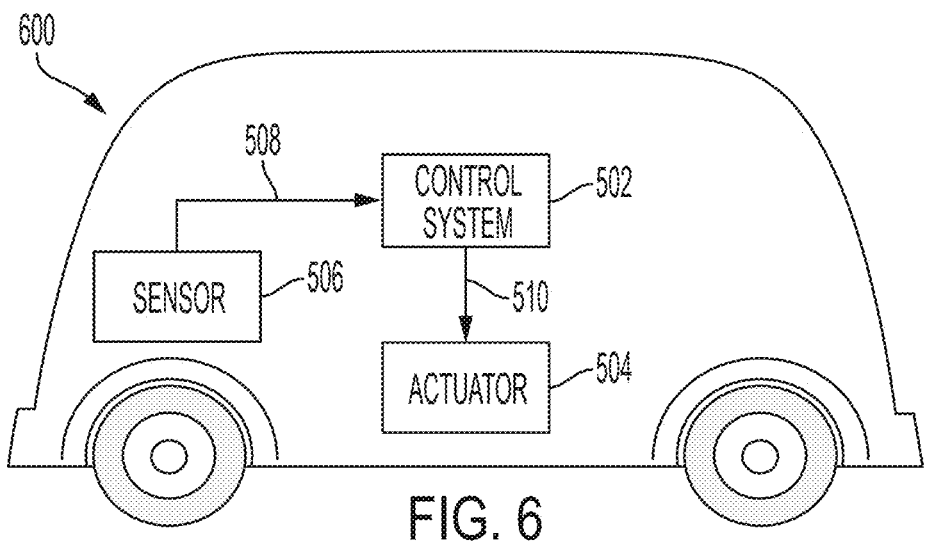
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
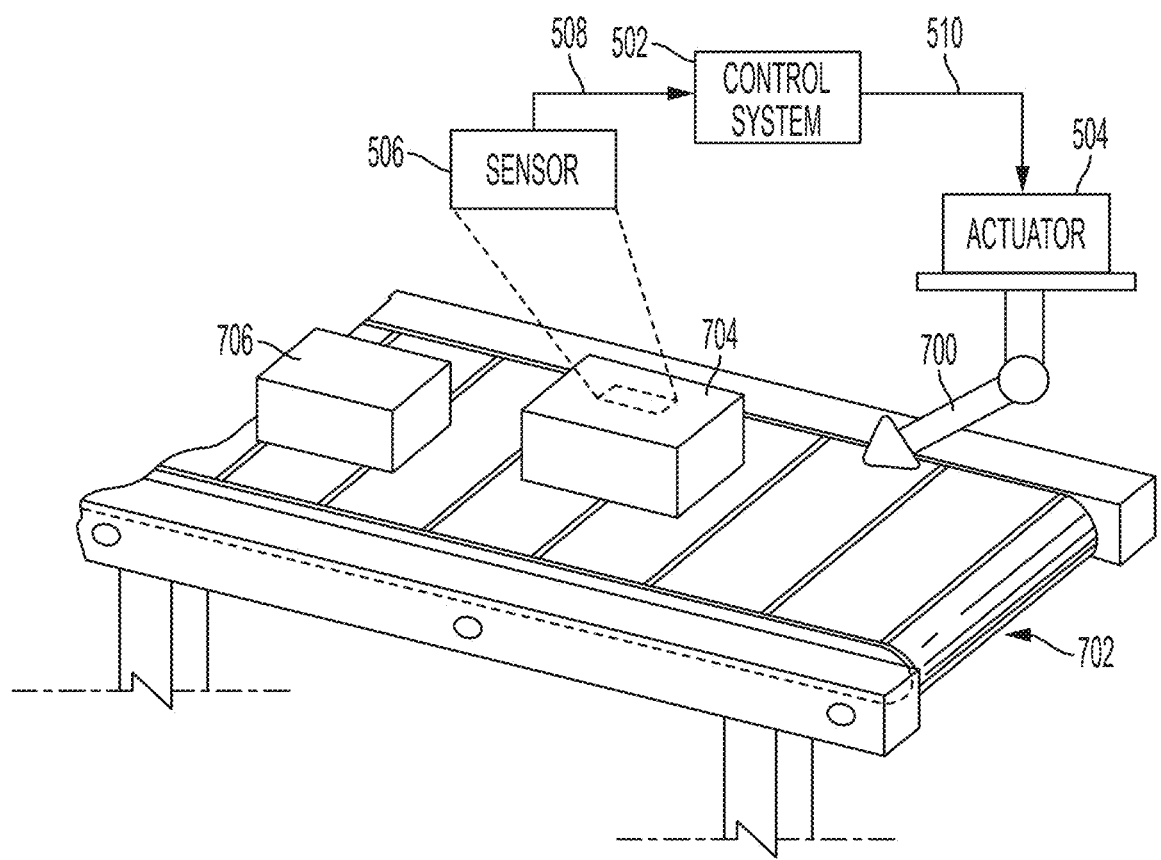
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
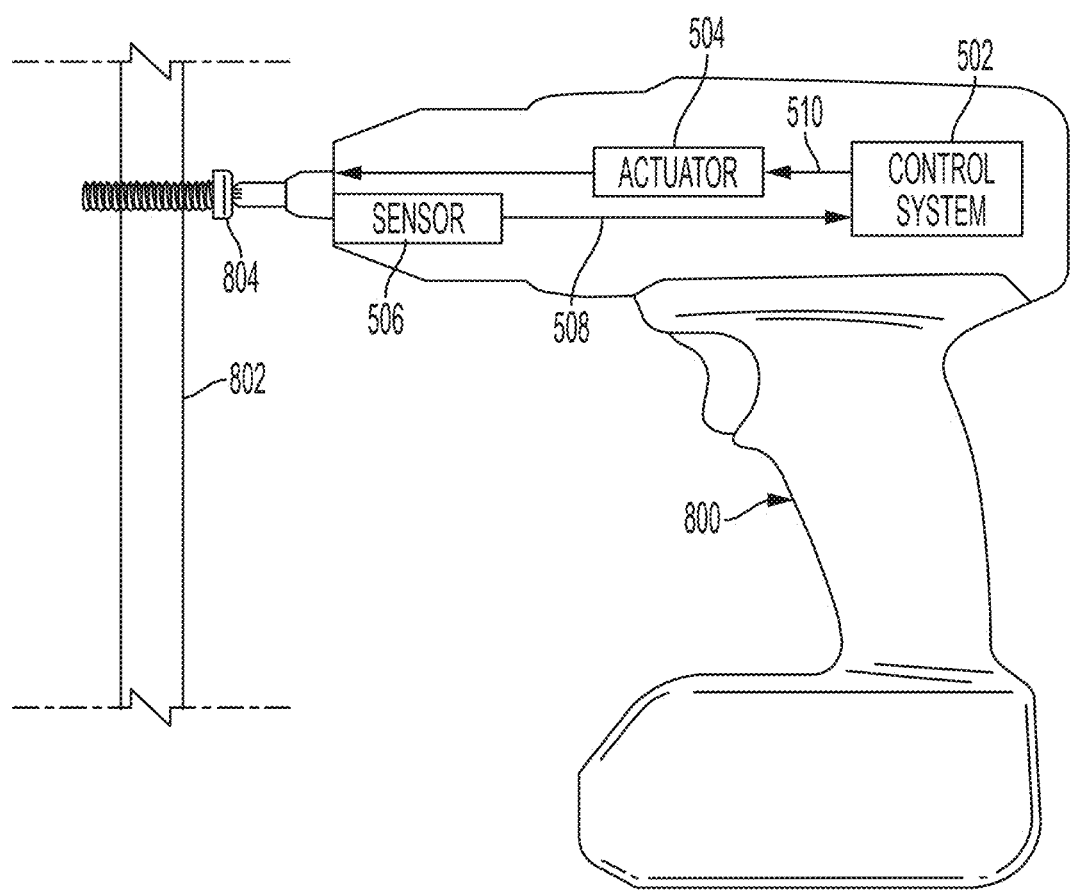
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
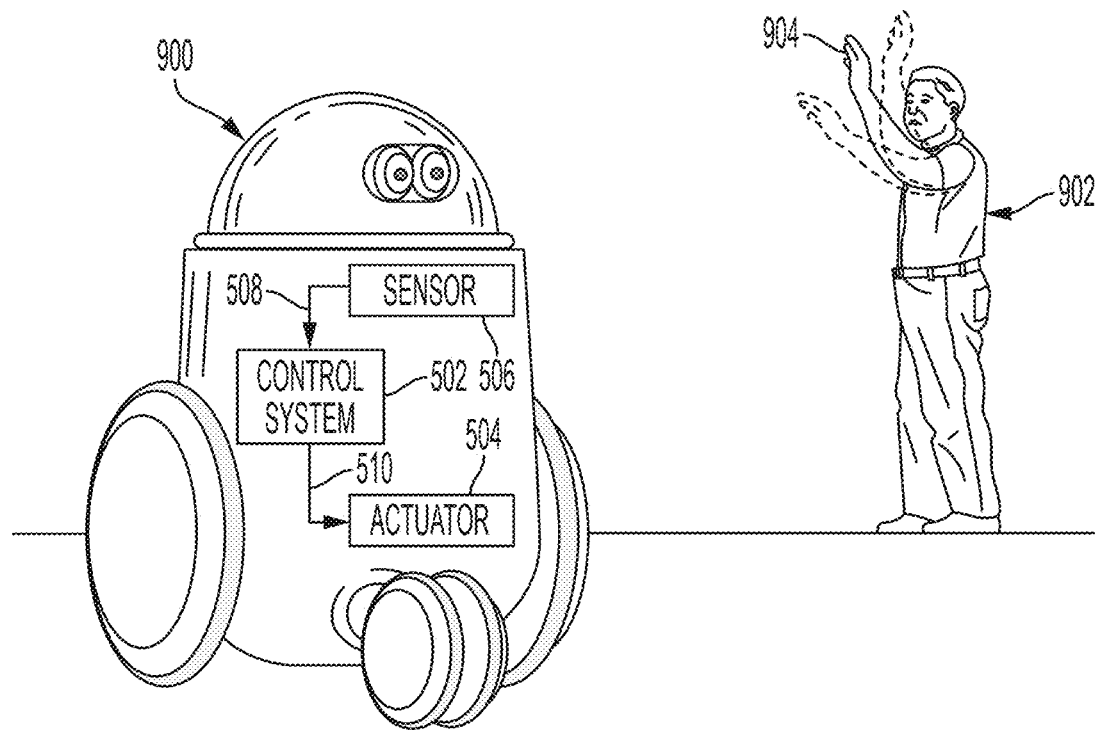
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
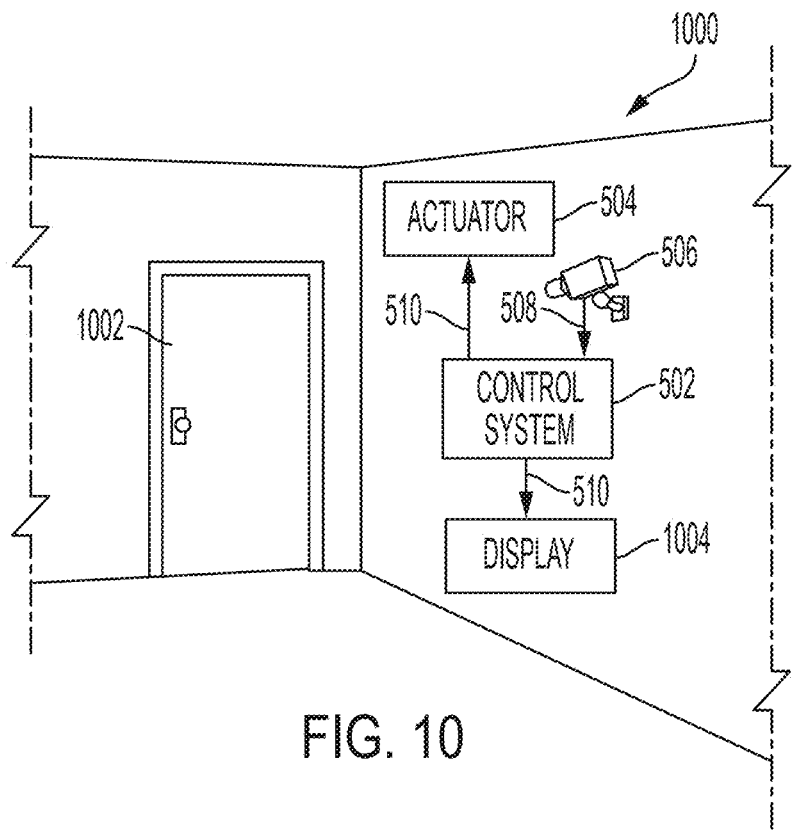
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
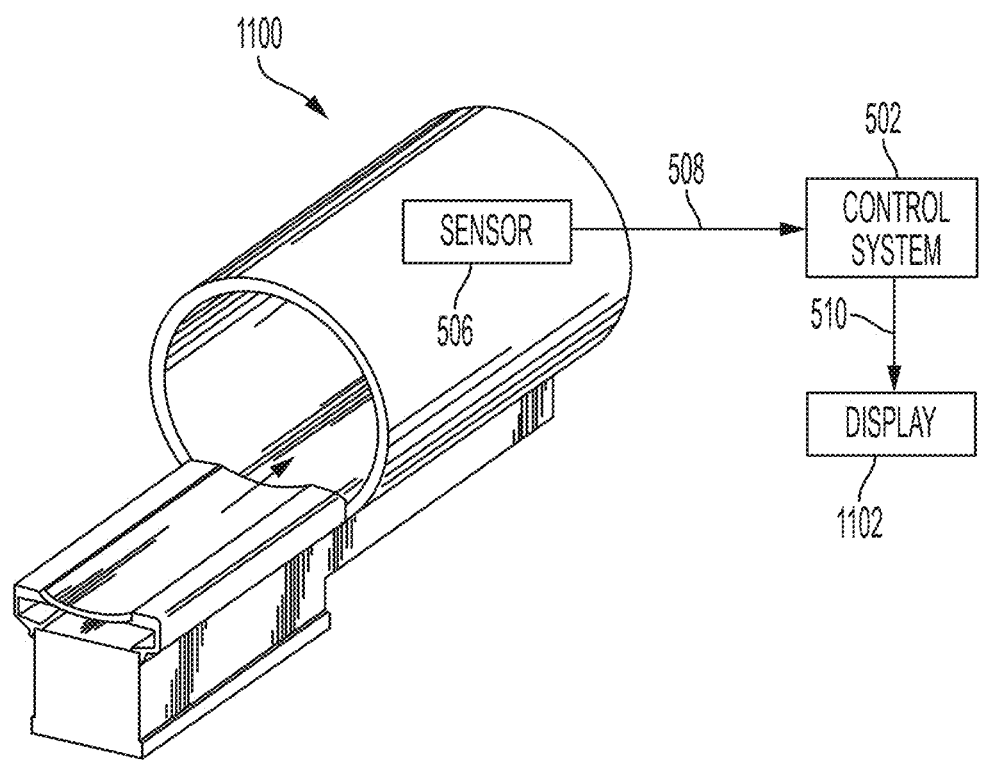
FIG. 11 depicts a schematic diagram of the control system of FIG. 5 configured to control an imaging system, for example an MM apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier

514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments, a method for semi-supervised training of a machine learning model includes, in response to at least one convergence criterion not being met: receiving a labeled dataset that includes a plurality of labeled samples; receiving an unlabeled dataset that includes a plurality of unlabeled samples; identifying a plurality of labeled-unlabeled sample pairs, each labeled-unlabeled sample pair including a respective labeled sample of the labeled samples and a corresponding unlabeled sample of the plurality of unlabeled samples; applying a data augmentation transformation to each labeled sample and each corresponding unlabeled sample for each labeled-unlabeled sample pair of the plurality of labeled-unlabeled sample pairs; computing, for each least one labeled-unlabeled sample pair, latent representation spaces using the machine learning model; generating, using the machine learning model, a label prediction for each unlabeled sample for each labeled-unlabeled sample pair; computing a loss function for each labeled-unlabeled sample pair of the plurality of labeled-unlabeled sample pairs based on respective latency representation spaces and respective label predictions; applying an optimization function to each respective loss function; and updating a weight value for each labeled-unlabeled sample pair of the plurality of labeled-unlabeled sample pairs responsive to applying the optimization function.

In some embodiments, the machine learning model includes a feature extractor and one or more predictor networks. In some embodiments, the method also includes training the machine learning model using the labeled dataset and the unlabeled dataset having samples propagated with predicted labels. In some embodiments, identifying the plurality of labeled-unlabeled sample pairs includes identifying the plurality of labeled-unlabeled sample pairs using a similarity graph associated with the labeled dataset and the unlabeled dataset. In some embodiments, the similarity graph is generated based on at least an expert derived similarity graph. In some embodiments, the loss function includes a combination of a mean squared error of each label prediction and a contrastive loss. In some embodiments, the optimization function includes a stochastic gradient descent optimization function. In some embodiments, the machine learning model is configured to perform at least one classification task. In some embodiments, the machine learning model is configured to perform at least one regression task.

In some embodiments, a system for semi-supervised training of a machine learning model includes a processor and a memory, The memory includes instructions that, when executed by the processor, cause the processor to, in response to at least one convergence criterion not being met: receive a labeled dataset that includes a plurality of labeled samples; receive an unlabeled dataset that includes a plurality of unlabeled samples; identify a plurality of labeled-unlabeled sample pairs, each labeled-unlabeled sample pair including a respective labeled sample of the labeled samples and a corresponding unlabeled sample of the plurality of unlabeled samples; apply a data augmentation transformation to each labeled sample and each corresponding unlabeled sample for each labeled-unlabeled sample pair of the plurality of labeled-unlabeled sample pairs; compute, for each least one labeled-unlabeled sample pair, latent representation spaces using the machine learning model; generate, using the machine learning model, a label prediction for each unlabeled sample for each labeled-unlabeled sample pair; compute a loss function for each labeled-unlabeled sample pair of the plurality of labeled-unlabeled sample pairs based on respective latency representation spaces and respective label predictions; apply an optimization function to each respective loss function; and update a weight value for each labeled-unlabeled sample pair of the plurality of labeled-unlabeled sample pairs responsive to applying the optimization function.

In some embodiments, the machine learning model a feature extractor and one or more predictor networks. In some embodiments, the instructions further cause the processor to train the machine learning model using the labeled dataset and the unlabeled dataset having samples propagated with predicted labels. In some embodiments, the instructions further cause the processor to identify the plurality of labeled-unlabeled sample pairs by identifying the plurality of labeled-unlabeled sample pairs using a similarity graph associated with the labeled dataset and the unlabeled dataset. In some embodiments, the similarity graph is generated based on at least an expert derived similarity graph. In some embodiments, the loss function includes a combination of a mean squared error of each label prediction and a contrastive loss. In some embodiments, the optimization function includes a stochastic gradient descent optimization function. In some embodiments, the machine learning model is configured to perform at least one classification task. In some embodiments, the machine learning model is configured to perform at least one regression task.

In some embodiments, an apparatus for semi-supervised training of a machine learning model includes a processor and a memory. The memory includes instructions that, when executed by the processor, cause the processor to, in response to at least one convergence criterion not being met: receive a labeled dataset that includes a plurality of labeled samples; receive an unlabeled dataset that includes a plurality of unlabeled samples; identify a plurality of labeled-unlabeled sample pairs, each labeled-unlabeled sample pair including a respective labeled sample of the labeled samples and a corresponding unlabeled sample of the plurality of unlabeled samples; apply a data augmentation transformation to each labeled sample and each corresponding unlabeled sample for each labeled-unlabeled sample pair of the plurality of labeled-unlabeled sample pairs; compute, for each least one labeled-unlabeled sample pair, latent representation spaces using a feature extractor of the machine learning model; generate, using one or more predictor networks of the machine learning model, a label prediction for each unlabeled sample for each labeled-unlabeled sample pair; compute a loss function for each labeled-unlabeled sample pair of the plurality of labeled-unlabeled sample pairs based on respective latency representation spaces and respective label predictions, the loss function including a combination of a mean squared error of each label prediction and a contrastive loss; apply an optimization function to each respective loss function; and update a weight value for each labeled-unlabeled sample pair of the plurality of labeled-unlabeled sample pairs responsive to applying the optimization function.

In some embodiments, the instructions further cause the processor to train the machine learning model using the labeled dataset and the unlabeled dataset having samples propagated with predicted labels.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for semi-supervised training of a machine learning model, the method comprising:
   determining whether at least one convergence criterion is met; and
   in response to the at least one convergence criterion not being met:
      receiving a labeled dataset that includes a plurality of labeled samples;
      receiving an unlabeled dataset that includes a plurality of unlabeled samples;
      identifying a plurality of labeled-unlabeled sample pairs, each labeled-unlabeled sample pair including a respective labeled sample of the labeled samples and a corresponding unlabeled sample of the plurality of unlabeled samples;
      applying a data augmentation transformation to each labeled sample and each corresponding unlabeled sample for each labeled-unlabeled sample pair of the plurality of labeled-unlabeled sample pairs;
      computing, for each least one labeled-unlabeled sample pair, latent representation spaces using the machine learning model;
      generating, using the machine learning model, a label prediction for each unlabeled sample for each labeled-unlabeled sample pair;
      computing a loss function for each labeled-unlabeled sample pair of the plurality of labeled-unlabeled sample pairs based on respective latency representation spaces and respective label predictions, wherein the loss function includes a contrastive loss term that utilizes a cosine similarity metric between the latent representations;
      applying a stochastic gradient descent optimization function to minimize each respective loss function, including the contrastive loss term; and
      updating a weight value for each labeled-unlabeled sample pair of the plurality of labeled-unlabeled sample pairs responsive to applying the optimization function.

2. The method of claim 1, wherein the machine learning model includes a feature extractor and one or more predictor networks.

3. The method of claim 1, further comprising training the machine learning model using the labeled dataset and the unlabeled dataset having samples propagated with predicted labels.

4. The method of claim 1, wherein identifying the plurality of labeled-unlabeled sample pairs includes identifying the plurality of labeled-unlabeled sample pairs using a similarity graph associated with the labeled dataset and the unlabeled dataset.

5. The method of claim 4, wherein the similarity graph is generated based on at least an expert derived similarity graph.

6. The method of claim 1, wherein the loss function includes a a mean squared error of each label prediction.

7. The method of claim 1, wherein the machine learning model is configured to perform at least one classification task.

8. The method of claim 1, wherein the machine learning model is configured to perform at least one regression task.

9. A system for semi-supervised training of a machine learning model, the system comprising:
   a processor; and
   a memory including instructions that, when executed by the processor, cause the processor to:
      determine whether at least one convergence criterion is met; and
      in response to the at least one convergence criterion not being met:
         receive a labeled dataset that includes a plurality of labeled samples;
         receive an unlabeled dataset that includes a plurality of unlabeled samples;
         identify a plurality of labeled-unlabeled sample pairs, each labeled-unlabeled sample pair including a respective labeled sample of the labeled samples and a corresponding unlabeled sample of the plurality of unlabeled samples;
         apply a data augmentation transformation to each labeled sample and each corresponding unlabeled sample for each labeled-unlabeled sample pair of the plurality of labeled-unlabeled sample pairs;
         compute, for each least one labeled-unlabeled sample pair, latent representation spaces using the machine learning model;

generate, using the machine learning model, a label prediction for each unlabeled sample for each labeled-unlabeled sample pair;

compute a loss function for each labeled-unlabeled sample pair of the plurality of labeled-unlabeled sample pairs based on respective latency representation spaces and respective label predictions, wherein the loss function includes a contrastive loss term that utilizes a cosine similarity metric between the latent representations;

apply a stochastic gradient descent optimization function to minimize each respective loss function, including the contrastive loss term; and update a weight value for each labeled-unlabeled sample pair of the plurality of labeled-unlabeled sample pairs responsive to applying the optimization function.

10. The system of claim 9, wherein the machine learning model a feature extractor and one or more predictor networks.

11. The system of claim 9, wherein the instructions further cause the processor to train the machine learning model using the labeled dataset and the unlabeled dataset having samples propagated with predicted labels.

12. The system of claim 9, wherein the instructions further cause the processor to identify the plurality of labeled-unlabeled sample pairs by identifying the plurality of labeled-unlabeled sample pairs using a similarity graph associated with the labeled dataset and the unlabeled dataset.

13. The system of claim 12, wherein the similarity graph is generated based on at least an expert derived similarity graph.

14. The system of claim 9, wherein the loss function includes a a mean squared error of each label prediction.

15. The system of claim 9, wherein the machine learning model is configured to perform at least one classification task.

16. The system of claim 9, wherein the machine learning model is configured to perform at least one regression task.

17. An apparatus for semi-supervised training of a machine learning model, the apparatus comprising:
 a processor; and
 a memory including instructions that, when executed by the processor, cause the processor to:

determine whether at least one convergence criterion is met; and in response to the at least one convergence criterion not being met:
 receive a labeled dataset that includes a plurality of labeled samples;
 receive an unlabeled dataset that includes a plurality of unlabeled samples;
 identify a plurality of labeled-unlabeled sample pairs, each labeled-unlabeled sample pair including a respective labeled sample of the labeled samples and a corresponding unlabeled sample of the plurality of unlabeled samples;
 apply a data augmentation transformation to each labeled sample and each corresponding unlabeled sample for each labeled-unlabeled sample pair of the plurality of labeled-unlabeled sample pairs;
 compute, for each least one labeled-unlabeled sample pair, latent representation spaces using a feature extractor of the machine learning model;
 generate, using one or more predictor networks of the machine learning model, a label prediction for each unlabeled sample for each labeled-unlabeled sample pair;
 compute a loss function for each labeled-unlabeled sample pair of the plurality of labeled-unlabeled sample pairs based on respective latency representation spaces and respective label predictions, the loss function including a combination of a mean squared error of each label prediction and a contrastive loss that utilizes a cosine similarity metric between the latent representations;
 apply a stochastic gradient descent optimization function to minimize each respective loss function, including the contrastive loss term; and
 update a weight value for each labeled-unlabeled sample pair of the plurality of labeled-unlabeled sample pairs responsive to applying the optimization function.

18. The apparatus of claim 17, wherein the instructions further cause the processor to train the machine learning model using the labeled dataset and the unlabeled dataset having samples propagated with predicted labels.

* * * * *